United States Patent [19]

Chapman et al.

[11] Patent Number: 5,426,015

[45] Date of Patent: Jun. 20, 1995

[54] METALLIZED AZO DIANION WITH TWO CATIONIC DYE COUNTER IONS FOR OPTICAL INFORMATION RECORDING MEDIUM

[75] Inventors: Derek D. Chapman; Michael P. Cunningham; Csaba A. Kovacs, all of Rochester, N.Y.

[73] Assignee: Eastman Kodak Company, Rochester, N.Y.

[21] Appl. No.: 137,331

[22] Filed: Oct. 18, 1993

[51] Int. Cl.⁶ .............................. G03C 1/72; G11B 7/24
[52] U.S. Cl. .................................... 430/275; 430/945; 430/273; 369/284; 369/288
[58] Field of Search .............. 430/495, 945, 275, 273, 430/270, 271; 369/288, 284

[56] References Cited

U.S. PATENT DOCUMENTS

| | | | |
|---|---|---|---|
| 4,626,496 | 12/1986 | Sato et al. | 430/495 |
| 4,652,514 | 3/1989 | Abe et al. | 430/495 |
| 4,735,839 | 4/1988 | Sato et al. | 430/495 |
| 4,735,889 | 4/1988 | Namba et al. | 430/495 |
| 4,756,987 | 7/1988 | Maeda et al. | 430/495 |
| 4,767,693 | 8/1988 | Oba et al. | 430/945 |
| 4,940,618 | 7/1990 | Hamada et al. | 430/945 |
| 4,994,343 | 2/1991 | Inagaki et al. | 430/945 |
| 4,996,089 | 2/1991 | Saito et al. | 430/945 |
| 5,090,009 | 2/1992 | Hamada et al. | 369/284 |
| 5,178,995 | 1/1993 | Fukui et al. | 430/495 |
| 5,219,707 | 6/1993 | Namba et al. | 430/495 |
| 5,272,047 | 12/1993 | Kovacs et al. | 430/495 |

FOREIGN PATENT DOCUMENTS

2005520 6/1990 Canada .

*Primary Examiner*—Charles L. Bowers, Jr.
*Assistant Examiner*—Martin J. Angebranndt
*Attorney, Agent, or Firm*—John R. Everett

[57] ABSTRACT

There is disclosed a recordable optical element that includes a recording layer. The element has a transparent substrate and on the surface of the substrate, a) a recording layer containing a light absorbing material and b) a light reflecting layer, the improvement wherein said light absorbing material has the structure:

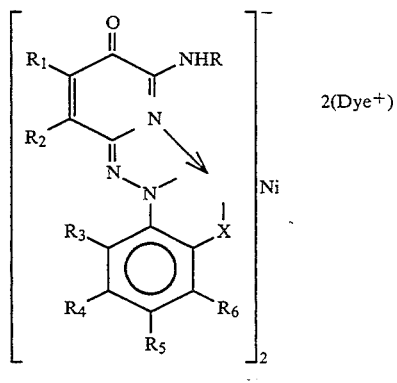

wherein;

R is hydrogen, alkyl having from 1 to about 20 carbons, substituted or substituted aryl from about 6 to 10 carbon atoms;

$R_1$ represents hydrogen or an alkyl group of from 1 to about 6 carbon atoms;

$R_2$ represents a hydrogen, an alkyl group of from 1 to about 5 carbon atoms; $SO_2R'''$ or $SO_2NHR'''$ where $R'''$ is an alkyl group from 1 to about 10 carbon atoms; an aryl group of from about 6 to 10 carbon atoms or a hetaryl group of from about 5 to about 10 carbon atoms or a halogen atom;

$R_3$ represents hydrogen, an alkyl group of from 1 to about 4 carbon atoms or a halogen atom;

$R_4$ represents alkyl group 1 to 10 carbon atoms; $SO_2R'''$, $SO_2NHR'''$ where $R'''$ is an alkyl group from 1 to about 10 carbon atoms; an aryl group of from about 6 to 10 carbon atoms or a hetaryl group of from about 5 to about 10 carbon atoms or a halogen atom;

$R_5$ represents an electron withdrawing group such as $NO_2$, CN, $SO_2R''''$, $SO_2NR^{V}R^{VI}$ where $R''''$, $R^{V}$ or $R^{VI}$ each independently can represent a hydrogen, an alkyl group of from 1 to about 5 carbon atoms; an aryl group of from about 6 to about 10 carbon atoms; a hetaryl group of from about 5 to about 10

(Abstract continued on next page.)

carbon atoms; or a cycloalkyl group of from about 5 to about 7 carbon atoms;

$R_6$ represents hydrogen; an alkyl group of from 1 to about 5 carbon atoms; or a halogen atom;

X represents oxygen, sulfur or carboxyl or sulfo groups; and $Dye^+$ can be any dye that has one or more positive charges.

7 Claims, No Drawings

METALLIZED AZO DIANION WITH TWO CATIONIC DYE COUNTER IONS FOR OPTICAL INFORMATION RECORDING MEDIUM

FIELD OF THE INVENTION

The present invention relates to optical recording materials. The materials are particularly useful in making recordable compact disks.

BACKGROUND OF THE INVENTION

There are many types of optical recording materials that are known. In many of the materials, the mode of operation requires that the unrecorded material have a high absorption and that the recorded areas, often referred to as pits, have low optical density or high reflection. The high reflection pits are made by ablating away the high absorption recording material, usually exposing an underlying reflective support.

One of the currently popular forms of optical storage of information is the compact disk or CD. Digital information is stored in the form of high optical density marks or pits on an otherwise reflective background, the exact opposite of the above described optical recording materials. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the optical density is higher than in those areas not having the deformations.

It is desirable to produce optical recording media which, when recorded in real time, produces a record that mimics the conventional CD on read out. Read out is at about 780 nm. In this manner, information can be added to the CD and the CD can be used on a conventional CD player.

One recently disclosed system of this type is the so called "Photo CD". In this system, conventional photographic film is first processed in a conventional manner. Then, the images from the film are digitized and the digital information is recorded in a CD readable form on an optical recording material. Images can then be played back on a CD type player into a conventional television. Since a CD has a capacity for a number of digitized images that is greater than the typical roll of consumer film, it is anticipated that the user will want to add images to a preexisting CD. Thus the need for recordable, CD compatible optical recording material.

Materials that can be used in this manner are described in U.S. Pat. No. 4,940,618, European Patent Application 0,353,393 and Canadian Patent Application 2,005,520.

Commercially useful materials of the type described in these references have stringent requirements. One of these requirements is light stability. Since the Photo CD is a consumer product, it must be capable of withstanding extreme environments. Between the time the original images are recorded on the Photo CD and the time subsequent images are recorded, the CD might be placed in strong sunlight, for example. The recording layer must be very light stable for this purpose.

In U.S. Pat. No. 4,626,496 there is described an optical recording medium wherein the recording layer consists essentially of a "double salt" of an organic dye cation and a metal complex anion. In the examples, most of the cationic dyes are cyanine dyes. The single charged anions are metal complexes, but no example is given of a doubly charged anion dye and in particular, there is no example of a doubly charged anionic azo dye. The main purpose for the anions in the '496 patent is to stabilize the cyanine dye. There is no disclosure of using the anion to make a index of refraction adjustment as well as stabilization. Based on the reported reflectivities, these "double salts" would not be useful in the writable CD type of system. This is shown in the comparative examples later in this specification.

Thus, there is a continuing need for optical recording materials that have the necessary optical characteristics so that they are CD compatible and yet are light stable. It is to a solution to this problem that the present invention is directed.

SUMMARY OF THE INVENTION

In accordance with the present invention there is provided a recordable optical element having a transparent substrate and on the surface of said substrate, a) a recording layer containing a light absorbing material and b) a light reflecting layer, the improvement wherein said light absorbing material has the structure:

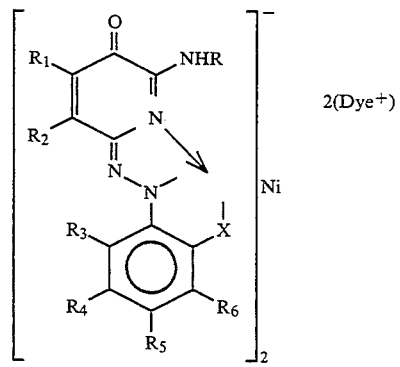

wherein;

R is hydrogen, alkyl having from 1 to about 20 carbons, substituted or substituted aryl from about 6 to 10 carbon atoms;

$R_1$ represents hydrogen or an alkyl group of from 1 to about 6 carbon atoms;

$R_2$ represents a hydrogen, an alkyl group of from 1 to about 5 carbon atoms; $SO_2R'''$ or $SO_2NHR'''$ where $R'''$ is an alkyl group from 1 to about 10 carbon atoms; an aryl group of from about 6 to 10 carbon atoms or a hetaryl group of from about 5 to about 10 carbon atoms or a halogen atom;

$R_3$ represents hydrogen, an alkyl group of from 1 to about 4 carbon atoms or a halogen atom;

$R_4$ represents alkyl group 1 to 10 carbon atoms; $SO_2R'''$, $SO_2NHR'''$ where $R'''$ is an alkyl group from 1 to about 10 carbon atoms; an aryl group of from about 6 to 10 carbon atoms or a hetaryl group of from about 5 to about 10 carbon atoms or a halogen atom;

$R_5$ represents an electron withdrawing group such as $NO_2$, $CN$, $SO_2R''''$, $SO_2NR^VR^{VI}$ where $R''''$, $R^V$ or $R^{VI}$ each independently can represent a hydrogen, an alkyl group of from 1 to about 5 carbon atoms; an aryl group of from about 6 to about 10 carbon atoms; a hetaryl group of from about 5 to about 10 carbon atoms; or a cycloalkyl group of from about 5 to about 7 carbon atoms;

$R_6$ represents hydrogen; an alkyl group of from 1 to about 5 carbon atoms; or a halogen atom;

X represents oxygen, sulfur or carboxyl or sulfo groups; and

Dye+ can be any dye that has one or more positive charges.

The above structure defines a material having four dye molecules. Two are complexed with nickel and the other two are cationic counter ions. For convenience, this material will be referred to as a "tetra dye" because it contains four dye molecules.

DETAILED DESCRIPTION OF THE INVENTION

In accordance with the invention, the optical recording element has a dye recording layer that includes the tetra dye light absorbing material described above. Mixtures of the tetra dye light absorbing material as well as mixtures of these materials with dyes of other classes are also contemplated.

In the descriptions above, alkyl can be a straight or branched chain group having up to about 10 carbon atoms such as methyl, ethyl or isopropyl. The aryl group can be, for example, phenyl, aminophenyl or propionylaminophenyl. The heteroaryl group can be, for example, 2-pyridyl or 2-furyl.

Also in the description above various substituents are also contemplated. Thus, the groups can be substituted with one or more alkoxy, alkoxycarbonyl, aryloxy, aryloxycarbonyl, carbamyl, sulfamoyl, acylamino, sulfonylamino, halogen, ureido, hydroxy, carbamoyloxy, alkoxycarbonylamino, cyano, thiocyano, carboxy or sulfo groups, etc.

In preferred embodiments, the Dye+ is a cyanine dye having the general structure:

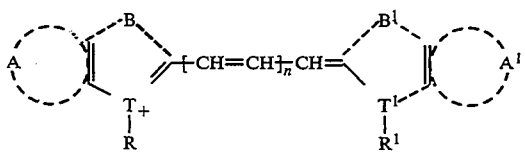

wherein:

T may be equal to or different from $T^1$, in which each represents C, N, O, or S, respectively;

A may be equal to or different from $A^1$, in which each represents an aromatic ring;

B may be equal to or different from $B^1$, in which each represents —O—, —S—,

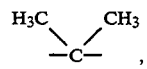

—Se—, —CH=CH—, or

where E represents an unsubstituted or substituted alkyl group of $C_1$-$C_{10}$ or unsubstituted or substituted aromatic ring; or B may be combined with A to form an aromatic ring;

R and $R^1$ exist when T is C or N, R is equal to or different from $R^1$ and represents an unsubstituted or substituted alkyl group of $C_1$-$C_{10}$ or an unsubstituted or substituted aromatic ring; and n represents an integer from 1 to 2.

Typical dyes of this type are described in U.S. Pat. No. 4,994,343 and 4,996,089.

Just prior to the examples below, there is described a typical synthesis of a tetra dye light absorbing material useful in the invention. Tables following the illustrative synthesis provide examples of specific materials that are useful.

The elements of the invention use tetra dye light absorbing materials. The optical information recording medium comprises a light transmitting, typically pregrooved substrate, the tetra dye light absorbing material light absorptive layer overlaying the substrate, a light reflective layer overlaying the light absorptive layer and a protective layer overlaying the light reflective layer. The recording process will produce marks of lower reflectivity than the unmarked areas of the disk when written and read with a diode laser emitting between 770 and 800 nm. It is preferred that the substituents on the dye molecule be selected so that the real part of the complex refractive index (N) of the unwritten light absorptive layer measured with 780 nm light source is not less than 1.8 and the imaginary part (k) is not greater than 0.3.

The substrate may be any transparent material that satisfies the mechanical and optical requirements. Generally pregrooved with groove depths from 20 nm to 250 nm, groove widths 0.2 to 1 µm and a pitch 1 to 2 µm. The preferred material is polycarbonate, other materials are glass, polymethylmethacrylate and other suitable polymeric materials.

The preparation of the optical recording element of the invention is achieved by spin coating of the tetra dye by itself, or with other dye or dyes or with addenda from a suitable solvent onto a transparent substrate. For coating, the tetra dye with or without addenda is dissolved in a suitable solvent so that the dye is 20 or less parts by weight to 100 parts of solvent by volume. The dye recording layer of the element is then overcoated with a metal reflective layer under reduced pressure by resistive heating or a sputter method and finally overcoated with a protective resin.

Coating solvents for the dye recording layer are selected to minimize their effect on the substrate. Useful solvents include as alcohols, ethers, hydrocarbons, hydrocarbon halides, cellosolves, ketones. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellosolve, ethyl cellosolve, 1-methyl-2-propanol, methy ethyl ketone, 4-hydroxy-4-methyl-2-pentanone, hexane, cyclohexane, ethylcyclohexane, octane, benzene, toluene, and xylene. Other less desirable solvents include water and dimethylsulfoxide. Preferred solvents are hydrocarbon solvents and alcohol solvents since they have the least effect on the preferred polycarbonate substrates. Mixtures of solvents can also be used.

Useful addenda for the recording layer include stabilizers, surfactants, binders and diluents.

The reflective layer can be any of the metals conventionally used for optical recording materials. Useful metals can be vacuum evaporated or sputtered and include gold, silver, aluminium and copper and alloys thereof.

The protective layer over the reflective layer is similarly conventional for this art. Useful materials include UV curable acrylates.

One preferred protective layer is disclosed in commonly assigned U.S. patent application 815,020, filed Dec. 27, 1991 in the names of Kosinski and Amell. This application discloses a two layer structure in which the layer adjacent to the reflective layer is spin coated and the a second layer is screen printed.

An intermediate layer, to protect the metal layer from oxidation, can also be present.

The element of the invention can have prerecorded ROM areas as described in U.S. Pat. No. 4,940,618. The surface of the substrate can have a separate heat deformable layer as described in U.S. Pat. No. 4,990,388. Other patents relating to recordable CD type elements are U.S. Pat. No. 5,009,818; 5,080,946; 5,090,009; 4,577,291; 5,075,147; and 5,079,135.

The following preparatory example illustrate the preparation of a dye useful in the invention.

Synthesis

The diazonium solution was added slowly to the coupler solution and the reaction mixture stirred at room temperature for 2 hours and then diluted with water and the dye removed by filtration. The solid was washed well with water and dried in a vacuum oven at 50° C. The yield of material pure by thin layer chromatography (tlc) was 35 g.

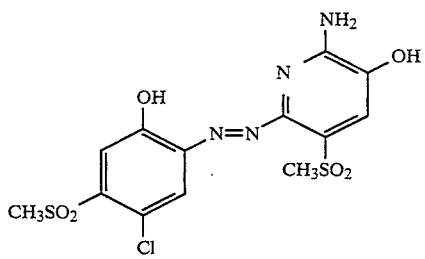

2-Amino-3-hydroxy-5-methylsulfonyl-6-(5-chloro-2-hydroxy-4-methylsulfonylphenyl)pyridine.

The above bromo compound (36 g) was dissolved in dimethyl formamide (DMF) (700 ml) and solid sodium methanesulfinate (9.5 g) added and the mixture stirred at room temperature for 4 hours. The reaction was monitored by tlc and when the starting material had disappeared the solution was diluted with water (1.21) containing sodium nitrate (50 g). After stirring overnight the solid was collected by filtration, washed well with water and dried. The yield was 34.9 g.

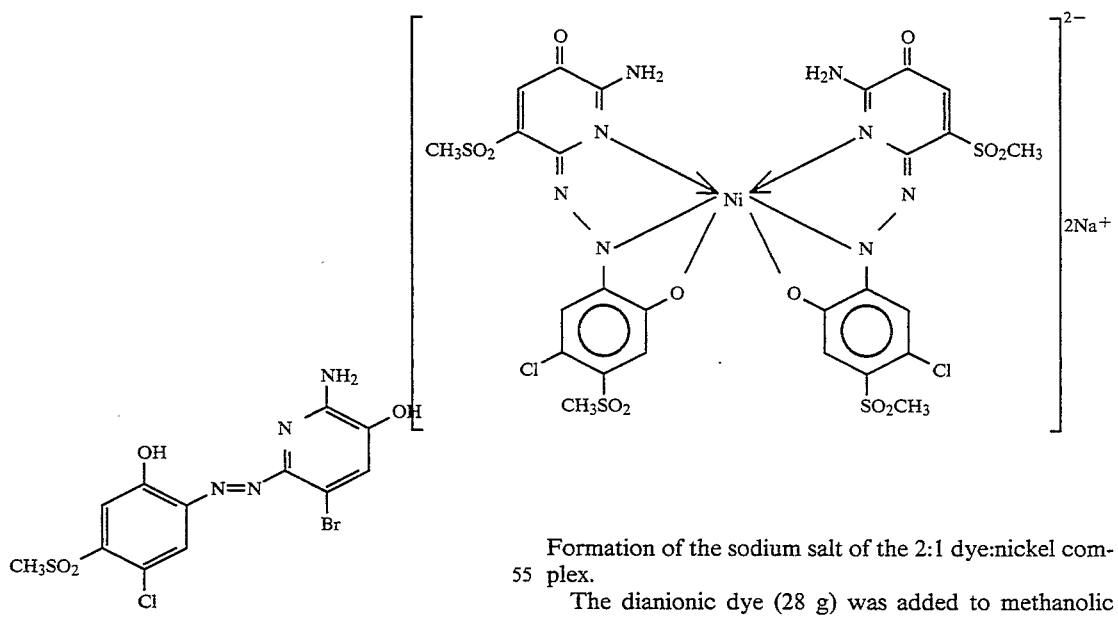

Synthesis of 2-amino-5-bromo-3-hydroxy-6-(5-chloro-2-hydroxy-4-methylsulfonylphenyl)pyridine.

5-Chloro-2-hydroxy-4-methylsulfonylaniline (20 g) was dissolved in a mixture of water (90 ml) and concentrated HCl (27 ml) and the solution cooled to <5° C. A solution of sodium nitrite (6.51 g) in water (15 ml) was added slowly and the diazonium solution stirred at ice bath temperature for 2 hours.

2-Amino-5-bromo-3-hydroxypyridine (17·g) was dissolved in methanol (600 ml) containing anhydrous sodium acetate (110 g) and the solution cooled to 0° C.

Formation of the sodium salt of the 2:1 dye:nickel complex.

The dianionic dye (28 g) was added to methanolic tetrabutylammonium hydroxide (1M 140 ml) and diluted with methanol (500 ml). Solid nickel acetate was added in portions and the metallization monitored by tlc. After 7.1 g had been added, no unmetallized dye was observed. The reaction mixture was poured into water (1.51) and stirred overnight. The product was filtered off, washed with water and dried in the vacuum oven. The bis tetrabutylammonium salt weighed 38.1 g of which 32 g was converted to the bis sodium salt by dissolution in acetonitrile (500 ml) adding sodium iodide (16 g) and removing the product by filtration. The yield was 22 g.

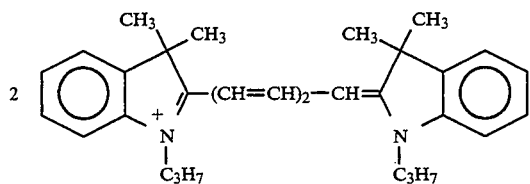

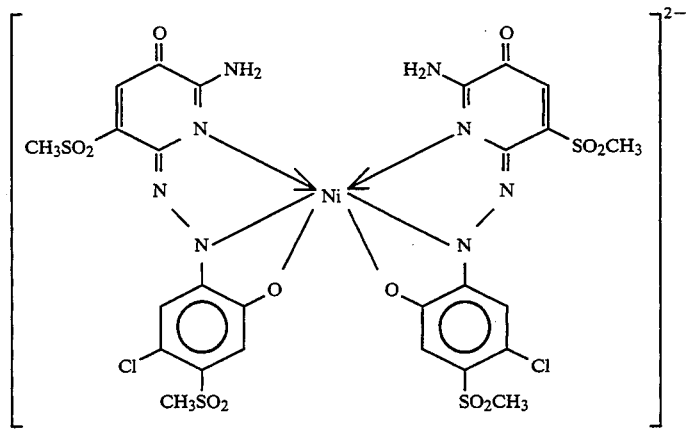

Isolation of tetra dye from the cyanine dye and the dye:nickel complex

The cyanine dye as the chloride salt (4.7 g) was dissolved in methanol (100 ml) and the dye:nickel complex (4.7 g) added. The mixture was stirred and then diluted with water(100 ml). The solid that precipitated was filtered off and washed with water followed by isopropyl alcohol (5 ml). After drying in the oven the yield was 7.3 g. Purification was effected by dissolution in dichloromethane followed by filtration and reprecipitation with ligroin. Other tetra dyes were prepared similarly from the appropriate cationic dyes and the dianionic metallized azo dyes.

The following azo structures in Table 1 were combined with some of the cationic dyes listed in Table 2.

TABLE 1

Tetra Dye: Anionic Portion

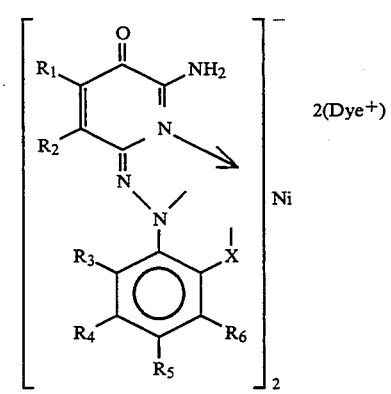

| Dye | $R_1$ | $R_2$ | $R_3$ | $R_4$ | $R_5$ | $R_6$ | X |
|---|---|---|---|---|---|---|---|
| A | H | H | H | Cl | $CH_3SO_2$ | H | O |
| B | H | Br | H | H | $CH_3SO_2$ | H | O |
| C | H | $CH_3SO_2$ | H | Cl | $CH_3SO_2$ | H | O |
| D | H | $CH_3SO_2$ | H | Cl | $(CH_3)_3CNHSO_2$ | H | O |
| E | $CH_3$ | $CH_3SO_2$ | H | Cl | $CH_3SO_2$ | H | O |
| F | $CH_3$ | $CH_3SO_2$ | H | H | $NO_2$ | H | $SO_3$ |
| G | H | $CH_3SO_2$ | H | H | $CH_3SO_2$ | H | O |

TABLE 2
Tetra Dye: Cationic Portion
| No. | Cation Dye Structure |
|---|---|
| 1 | 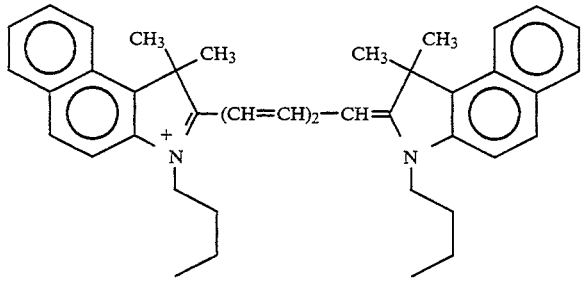 |
| 2 | 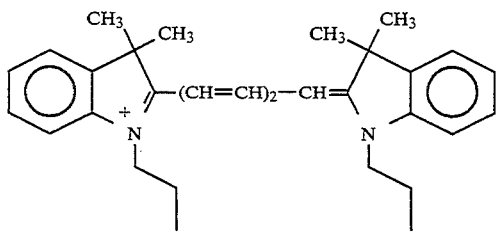 |
| 3 | 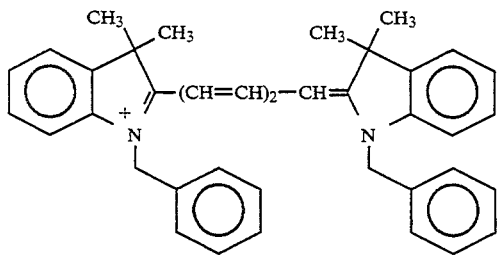 |
| 4 | 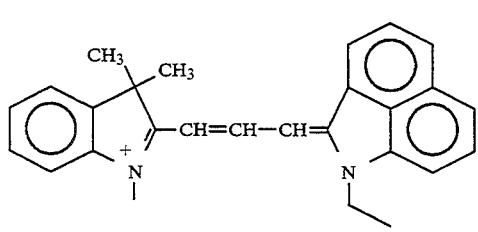 |
| 5 | 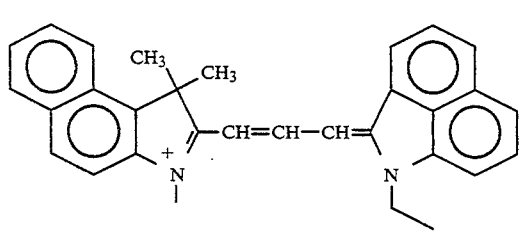 |
| 6 | 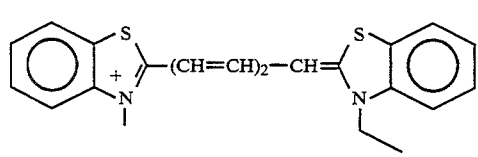 |

TABLE 2-continued

Tetra Dye: Cationic Portion

| No. | Cation Dye Structure |
|---|---|
| 7 | |
| 8 | |
| 9 | |
| 10 | |
| 11 | |
| 12 | |
| 13 | |

TABLE 2-continued

Tetra Dye: Cationic Portion

| No. | Cation Dye Structure |
|-----|----------------------|
| 14  | ![structure 14]      |
| 15  | ![structure 15]      |

The currently preferred tetra dyes have the anionic portion "C" from above as follows:

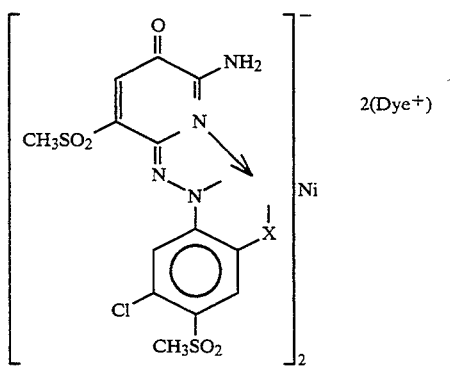

These dyes have good optical properties and light stability, particularly dyes C2 (excellent optical properties) and C4 (excellent light stability). Thus, these are the currently preferred tetra dyes. The synthesis of $C_2$ is illustrated above.

Example 1 with Dye A1

This example shows the use of tetra dye "A1". That is, the anionic portion is "A" from Table 1 and the cationic portion is "1" from Table 2.

A polycarbonate disc substrate having a thickness of 1.2 mm, an outer diameter of 120 mm and an inner diameter of 15 mm and having a spiral pregrooved formed on its surface with a width of 0.4 $\mu$m, and a depth of 0.08 $\mu$m and a pitch of 1.6 $\mu$m, was made by injection molding.

To form the light absorptive layer 1 part by weight of dye A1 was dissolved in 40 parts of 2,2,3,3-tetrafluoropropanol by volume with stirring at room temperature for 1 hour. Then, the solution was filtered through a 0.2$\mu$filter. The solution was coated on the surface of the substrate by spin coating to an optical density of 1.3 at 671 nm. It was dried at 80° C. for 15 minutes.

A gold reflective layer was then deposited by resistive heating on the entire surface of the disc to about 1200 Å thickness.

To protect the gold layer a lacquer (Daicure SD-17 TM) was applied by spin coating onto the gold layer to a thickness of 7 to 11 $\mu$m and it was UV cured with an 'H' bulb using a fusion system cure at 3000 W/inch power for 15 seconds.

To test the optical disc thus obtained a test system consisting of an optical head with a 788 nm laser, a 0.5 NA lens, phase tracking, and ½ aperture focusing was used. The optics used circularly polarized light to reduce laser feedback effects. Recording and play back were carried out with the same laser at 5.6 m/s rotational speed. The read power was kept at 0.6 mW. Single frequency was recorded with about 3.5 micron mark length at 12 mW write power, through 30 Kz filter, forming marks of lower reflectivity than the unmarked area when examined with a light source emitting at 788 nm light. When the marks were read the CNR (carrier to noise ratio) was 65 dB.

Examples 2 to 18

Discs for testing in examples 2 to 19 were prepared on the same substrate by the same procedure as in example 1. The optical densities, CNR-s in dB-s and the recording power of the laser are listed in table 3.

TABLE 3

[Azo Dye]$^{2-}$ 2[Counter Ion Dye]$^{+}$

| Example | Azo Dye | Counter Ion Dye | OD at 671 nm | CNR (dB)/ Power (mW) |
|---------|---------|-----------------|--------------|----------------------|
| 1       | A       | 1               | 1.3          | 65/12                |
| 2       | A       | 5               | 0.9          | 52/12                |
| 3       | C       | 2               | 1.6          | 61/15                |
| 4       | C       | 3               | 1.4          | 50/15                |
| 5       | C       | 4               | 1.2          | 62/15                |
| 6       | C       | 5               | 1.1          | 63/13                |
| 7       | C       | 6               | 1.3          | 64/15                |
| 8       | C       | 9               | 1.3          | 50/14                |
| 9       | C       | 10              | 1.2          | 56/16                |
| 10      | C       | 12              | 1.5          | 58/15                |
| 11      | C       | 13              | 1.4          | 63/15                |
| 12      | D       | 2               | 1.5          | 63/16                |
| 13      | E       | 10              | 1.3          | 61/16                |
| 14      | E       | 11              | 1.3          | 61/14                |
| 15      | F       | 2               | 1.8          | 61/18                |
| 16      | F       | 4               |              |                      |
| 17      | F       | 14              | 1.3          | 56/17                |

TABLE 3-continued

| | [Azo Dye]²⁻ 2[Counter Ion Dye]⁺ | | | |
|---|---|---|---|---|
| Example | Azo Dye | Counter Ion Dye | OD at 671 nm | CNR (dB)/ Power (mW) |
| 18 | G | 14 | 1.3 | 65/14 |

Dye Stability Examples

Dyes useful in the present invention and comparison dyes were tested for both light and dark stability.

For the light stability tests, the dyes were spin coated on 2 by 2 inch polycarbonate slides. Optical density measurements were taken 5 mm from the edge on two opposite sides of the slides with a diode array spectrophotometer between 400 nm and 800 nm wave lengths. One measured side of the slide was covered and the slide was exposed through the polycarbonate for sixteen days by a method recommended by the Image Stability Technical Center for standard 50 klux Daylight exposure(ANSI IT9.9-1990 "Stability of Color Photographic Images" Section 5 Paragraph 5.6 Describes Simulated Indoor Indirect Daylight exposure). After sixteen days, the optical densities were re-measured on both sides. To calculate the percent optical density loss, from the optical density value at λ-max before light exposure the optical density value after light exposure was subtracted. The resulting value was divided by the optical density value before light exposure and multiplied by one hundred. This calculation was carried out with both the uncovered and covered sides of the slides. Then, from the value obtained from the uncovered side the value obtained from the covered side was subtracted and the resulting value was taken as the percent optical density loss as a result of light exposure.

Light Stability Table

| Dye | % Optical Density Loss After 16 days 50 Klux light Exposure |
|---|---|
| IV-8 and A15 from '496 | 27.6 |
| C2 | 11.0 |
| C4 | 3.1 |
| C5 | 9.7 |
| C10 | 2.8 |
| E10 | 7.1 |

Dark Stability

For the dark stability test, the dyes were also spin coated on 2 by 2 inch polycarbonate slides. Optical density measurements were taken before incubation with a diode array spectrophotometer between 400 nm and 800 nm wave lengths. The slides were incubated for six weeks in a humidity chamber set at 80° C. temperature and relative humidity with the slides placed, dye side up, in petri dishes with the tops slightly open. Then optical measurements were taken after six weeks of incubation. To determine the percent optical density loss, from the optical density value at λ-max before incubation the optical density value after incubation was subtracted. The resulting number was divided by the optical density value before incubation and multiplied by one hundred to give the percent loss in optical density as a result of incubation.

Dark Stability Table

| Dye | % Optical Density Loss After 6 weeks at 80° C./80% RH |
|---|---|
| IV-8 and A15 from '496 | 6.9 |
| C2 | 1.0 |
| C4 | 5.5 |
| C5 | 9.9 |
| C10 | 7.7 |
| E10 | 4.7 |

Thus, while the dark stability of the dyes of the prior art is reasonable, the dyes used in the present invention have much improved light stability.

Comparative Examples with Dyes from '496

To confirm the ineffectiveness of the dyes of U.S. Pat. No. 4,626,496 a dye corresponding to dye cation IV-8 and metal complex anion A15 as described in the patent was prepared. (This is the same dye used in the light stability and dark stability tests above. "A15" in these comparative examples should not be confused with an A15 dye of the present invention. The "A15" designation for these comparative examples is from the '496 patent.)

First, a solvent that dissolves the IV8-A15 dye but which does not attack the polycarbonate substrate could not be found. Second, to obtain the optical indices on this material, attempts to coat this material from different solvents on silicon wafers failed. The coatings turned opaque. Glass discs spin coated to an optical density of 1.46 at 671 nm with a 2.5% solution of the dye in 1,2-dichloromethane and then gold coated to 120 nm thickness were prepared. The coated layers when examined at 788 nm gave a reflectivity of only 23.7%. Attempts to write gave a maximum CNR at 11 mW power of only 45.6 dB.

The invention has been described with particular reference to preferred embodiments thereof but it will be understood that modifications can be made within the spirit and scope of the invention.

What is claimed is:

1. A recordable optical element having a transparent substrate and on the surface of said substrate, a) a recording layer containing a light absorbing material and b) a light reflecting layer, the improvement wherein said light absorbing material has the structure:

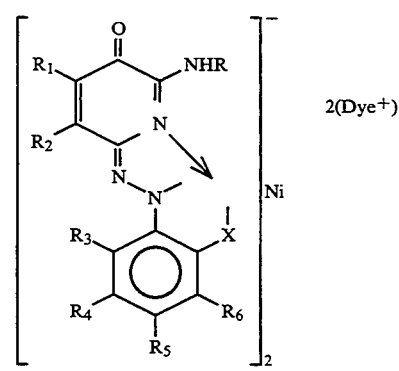

wherein;

R is hydrogen, alkyl having from 1 to about 20 carbons, aryl from about 6 to 10 carbon atoms;

$R_1$ represents hydrogen or an alkyl group of from 1 to about 6 carbon atoms;

$R_2$ represents a hydrogen, an alkyl group of from 1 to about 5 carbon atoms; $SO_2R'''$ or $SO_2NHR'''$ where $R'''$ is an alkyl group from 1 to about 10 carbon atoms; an aryl group of from about 6 to 10 carbon atoms or a hetaryl group of from about 5 to about 10 carbon atoms or a halogen atom;

$R_3$ represents hydrogen, an alkyl group of from 1 to about 4 carbon atoms or a halogen atom;

$R_4$ represents alkyl group 1 to 10 carbon atoms; $SO_2R'''$, $SO_2NHR'''$ where $R'''$ is an alkyl group from 1 to about 10 carbon atoms; an aryl group of from about 6 to 10 carbon atoms or a hetaryl group of from about 5 to about 10 carbon atoms or a halogen atom;

$R_5$ represents an electron withdrawing group such as $NO_2$, CN, $SO_2R''''$, $SO_2NR^VR^{VI}$ where $R''''$, $R^V$ or $R^{VI}$ each independently can represent a hydrogen, an alkyl group of from 1 to about 5 carbon atoms; an aryl group of from about 6 to about 10 carbon atoms; a hetaryl group of from about 5 to about 10 carbon atoms; or a cycloalkyl group of from about 5 to about 7 carbon atoms;

$R_6$ represents hydrogen; an alkyl group of from 1 to about 5 carbon atoms; or a halogen atom;

X represents oxygen, sulfur or carboxyl or sulfo groups; and

Dye+ can be any dye that has one or more positive charges.

2. A recordable optical element according to claim 1 wherein said light absorbing material has the structure:

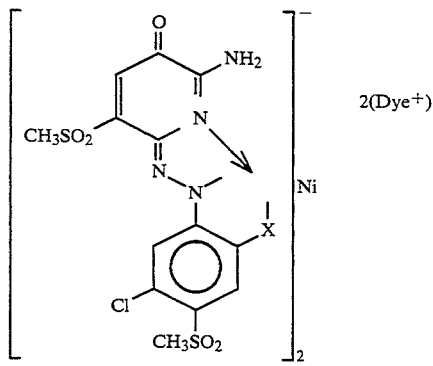

3. A recordable optical element according to claim 1 wherein Dye+ has the structure:

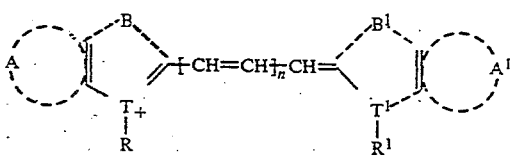

wherein:
T may be equal to or different from $T^1$, in which each represents C, N, O, or S, respectively;
A may be equal to or different from $A^1$, in which each represents an aromatic ring;
B may be equal to or different from $B^1$, in which each represents —O—, —S—, $$\overset{H_3C\quad CH_3}{\underset{|}{C}},$$

—Se—, —CH=CH—, or $$\overset{-N-}{\underset{E}{|}},$$

where E represents an alkyl group of $C_1$-$C_{10}$ or aromatic ring; or B may be combined with A to form an aromatic ring;

R and $R^1$ exist when T is C or N, R is equal to or different from $R^1$ and represents an alkyl group of $C_1$-$C_{10}$ or an aromatic ring; and n represents an integer from 1 to 2.

4. A recordable optical element according to claim 1 wherein Dye+ has the structure:

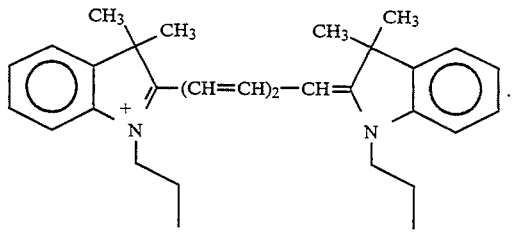

5. A recordable optical element according to claim 1 wherein Dye+ has the structure:

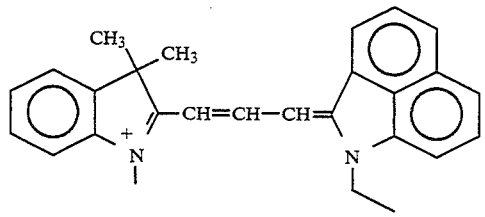

6. A recordable optical element according to claim 1 wherein Dye+ has the structure:

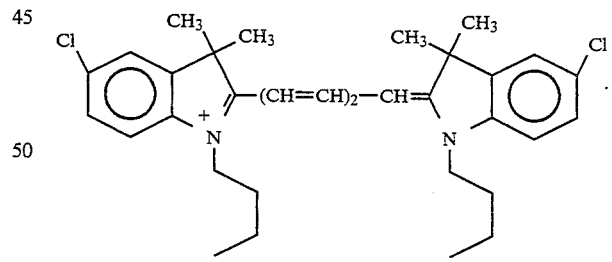

7. A recordable optical element according to claim 1 wherein Dye+ has the structure:

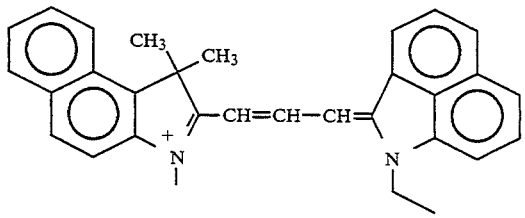

* * * * *